United States Patent
Amunts et al.

(10) Patent No.: US 8,160,317 B2
(45) Date of Patent: Apr. 17, 2012

(54) METHOD FOR TOPOGRAPHICAL PRESENTATION OF ALTERATIONS IN AN EXAMINED BRAIN

(75) Inventors: Katrin Amunts, Welz (DE); Karl Zilles, Köln (DE); Hartmut Mohlberg, Düsseldorf (DE); Axel Schleicher, Erftstadt (DE); Lars Hömke, Köln (DE)

(73) Assignee: Forschungszentrum Juelich GmbH, Juelich (DE)

( * ) Notice: Subject to any disclaimer, the term of this patent is extended or adjusted under 35 U.S.C. 154(b) by 896 days.

(21) Appl. No.: 12/096,117

(22) PCT Filed: Nov. 29, 2006

(86) PCT No.: PCT/EP2006/011463
§ 371 (c)(1),
(2), (4) Date: Jul. 29, 2008

(87) PCT Pub. No.: WO2007/065589
PCT Pub. Date: Jun. 14, 2007

(65) Prior Publication Data
US 2008/0298653 A1    Dec. 4, 2008

(30) Foreign Application Priority Data
Dec. 5, 2005    (DE) .......................... 10 2005 058 095

(51) Int. Cl.
*G06K 9/00*    (2006.01)
(52) U.S. Cl. ...................................................... 382/128
(58) Field of Classification Search ........... 382/100–154
See application file for complete search history.

(56) References Cited

U.S. PATENT DOCUMENTS
6,771,736 B2 *    8/2004    Sabol et al. ................ 378/98.12
(Continued)

FOREIGN PATENT DOCUMENTS
DE    19829170    1/2000
(Continued)

OTHER PUBLICATIONS

"Lesion mapping in MRI data—an application of cytoarchitectonic probabilistic maps" Second Vogt-Brodmann Symposium [Online] 2004, XP00242667, Juelich Gefunden im Internet; URL:http://www.am.uni.-duesseldorf.de/~hoemke/posters/lesionmapping.pdf (Mar. 13, 2007).

(Continued)

*Primary Examiner* — Dixomara Vargas
(74) *Attorney, Agent, or Firm* — Andrew Wilford

(57) ABSTRACT

The invention relates to a method for the topographical presentation of structural alterations in an examined brain using volume data records. In line with the invention, this method is distinguished in that functional areas are mapped by extracting profiles, where the profiles record boundaries for two functional areas in the examined brain, in that the boundaries of the two functional areas are recorded by calculating a multivariant distance measurement, and in that a microstructure in the region of the boundaries of the two cortical areas is recorded and is compared with at least one microstructure in a boundary region of a reference brain. To increase the comparability of various areas in various brains taking into account the interindividual variability, it is expedient for the volume data records to be transformed to a target volume data record using an elastic registration method.

8 Claims, 3 Drawing Sheets

U.S. PATENT DOCUMENTS

Figure 1:

| | | | |
|---|---|---|---|
| 7,050,615 B2 * | 5/2006 | Avinash et al. | 382/131 |
| 7,689,021 B2 * | 3/2010 | Shekhar et al. | 382/131 |
| 7,778,490 B2 * | 8/2010 | Quist | 382/294 |
| 7,948,503 B2 * | 5/2011 | Shekhar et al. | 345/648 |
| 8,000,508 B2 * | 8/2011 | Bystrov et al. | 382/128 |
| 8,031,211 B2 * | 10/2011 | Shekhar et al. | 345/648 |
| 8,064,664 B2 * | 11/2011 | Suri et al. | 382/128 |
| 2003/0036083 A1 | 2/2003 | Tamez-Pena et al. | 435/6 |

FOREIGN PATENT DOCUMENTS

| | | |
|---|---|---|
| DE | 102004003381 | 9/2005 |
| EP | 1598778 | 5/2004 |
| WO | WO-9824367 | 6/1998 |
| WO | WO-0065985 | 11/2000 |
| WO | WO-0156466 | 8/2001 |

OTHER PUBLICATIONS

Schleicher, A., Zilles K.: "A quantitative approach to cytoarchtectoics: analysis . . . " In: The Royal Microscopical Society, 1990, p. 367-381.

G. E. Christensen, et al. "Volumetric Transformation of Brain Anatomy", IEEE Trans. on Medical Imaging, vol. 16, No. 6, Dec. 1997, p. 864-877.

XP00242664: "Analysis of neural mechanisms underlying verbal fluency in cytoarchitectonically defined steretaxic space—The roles of Brodmann areas 44 and 45".

XP009080529: "Lesion Preserving Image Registration with applications to Human Brains".

XP002424665 "Observer-Independent Method for Microstructural Parcellation of Cerebral Cortex: A Quantitative Approach to Cytoarchitectonics".

XP004870116 "A new SPM toolbox for combining probablistic cytoarchitectonic maps and functional imaging data".

XP009080525 "Elastische Anpassung in der digitalen Bildverabeitung auf mehreren Auflosungsstufen mit Hilfe von Mehrgitterverfahren".

XP002424666 "A Multigrid Approach for Minimizing a Nonlinera Functional for Digital Image Matching".

XP009080509 "Multimodal image registration using a varational approach".

* cited by examiner

METHOD FOR TOPOGRAPHICAL PRESENTATION OF ALTERATIONS IN AN EXAMINED BRAIN

CROSS REFERENCE TO RELATED APPLICATIONS

This application is the US national phase of PCT application PCT/EP2006/011463, filed 29 Nov. 2006, published 14 Jun. 2007 as WO 2007/065589, and claiming the priority of German patent application 102005058095.5 itself filed 5 Dec. 2005, whose entire disclosures are herewith incorporated by reference.

The invention relates to a method for the topographical presentation especially of structural changes in brains, through the use of volume data sets.

The article by G. E. Christensen et al. titled "Volumetric Transformation of Brain Anatomy", IEEE Trans. on Medical Imaging, Vol. 16, No. 6, December 1997, pages 846 to 877, discloses a method in which functional regions of the body are imaged and analyzed. In this method, relative positions of voxels of an examined object are compared to voxels of a reference object.

It is the objective of the invention to provide a method of the generic type that allows a fast and reliable determination of specific regions of the examined brain.

According to the invention, this objective is achieved in that functional areas are mapped by extracting profiles, whereby the profiles detect boundaries of two areas of the examined brain, whereby the boundary of the two areas is detected by computing a multivariate distance measure, whereby a change in the microstructure in the region of the boundary of the two areas is acquired and compared to at least one boundary region of another brain.

For purposes of increasing the comparability of different areas of different brains, taking into consideration inter-individual variability, it is advantageous for the volume data sets to be transformed into a target volume data set using an elastic registration method.

The image registration presented below comprises a deformation of an image (template), so that this image becomes similar or identical to another (reference) image. Many different terms exist for this in the literature, particularly in the medical literature: matching, registration, morphing, warping, normalization, etc.

In particular, it is advantageous that a grayscale-based energy functional is ascertained by means of a multigrid method.

Advantageously, the energy functional consists of an elastic portion and of a grayscale distance of the volume data sets.

The invention is suitable for application cases in which zones are examined without employing a boundary-search step as well as for examining a boundary between two areas.

An example of the use of the invention without a boundary-search step is the mapping of subcortical core region and fiber tracts.

An examination of boundary regions between areas, however, is particularly advantageous because functional and/or structural properties of the brain vary in these boundary regions.

Accordingly, the boundary-search steps presented in this application are particularly advantageous.

Examples of the use of boundary-search steps according to the invention refer, for instance, to boundaries between cytoarchitectonic areas such as the boundary between the striate and the extrastriate cortex.

An especially preferred embodiment of the invention is characterized in that the boundary between the areas is ascertained by means of a change in at least one functional parameter and in that resulting voxels of the areas are acquired and transformed in such a way that the transformed voxels of the initial data set correspond to at least individual voxels of a reference brain.

A particularly preferred embodiment of the invention is characterized in that, in each case, a vector is ascertained for voxels of the reference brain, said vector allowing a transformation into the appertaining spatial coordinates of the examined brain, whereby several vectors are stored and are then available for as many further examinations as desired.

Moreover, it is also practical that the data of the examined brain and of the reference brain are made to overlap in a target data set, a process in which probability maps are computed that, for several voxels of the examined brain, indicate the relative frequency with which the ascertained functional area is present in a corresponding region of this reference brain.

The probability maps are also called probabilistic maps or population maps.

Other advantages, special features and practical refinements of the invention ensue from the subordinate claims and from the presentation below of preferred embodiments making reference to the figures.

Figure 2:
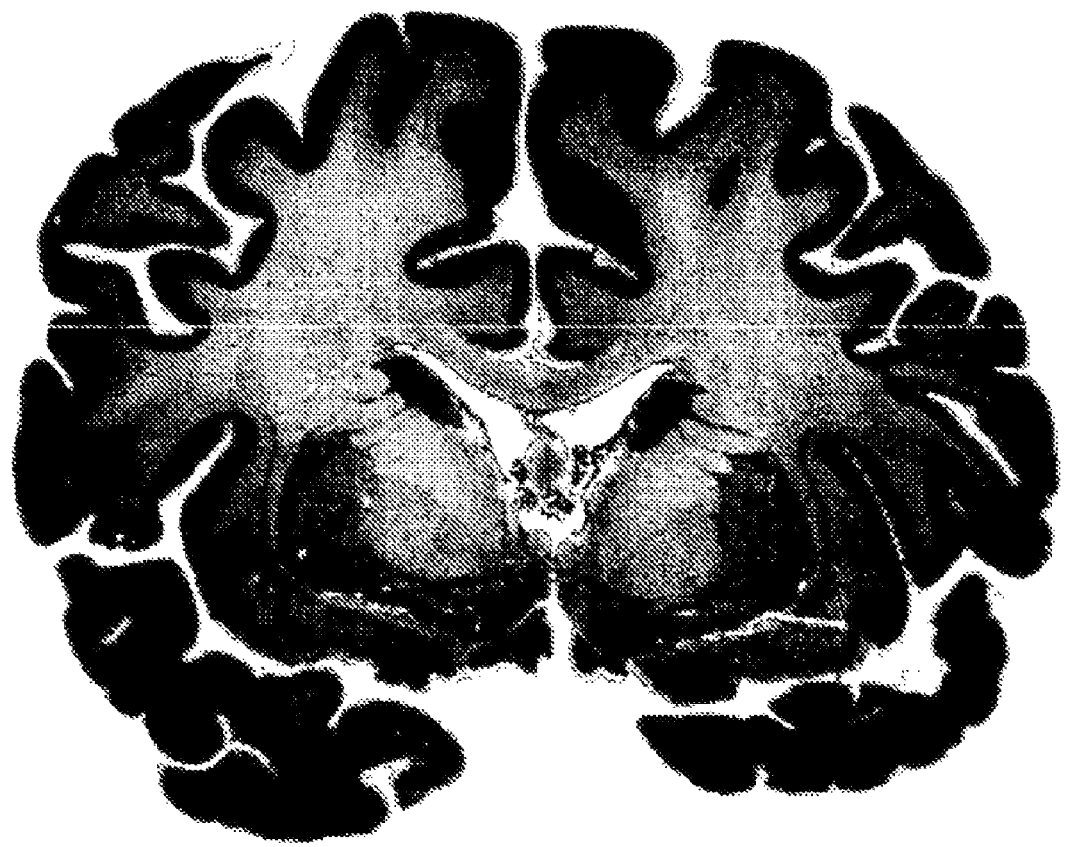
Figure 3:
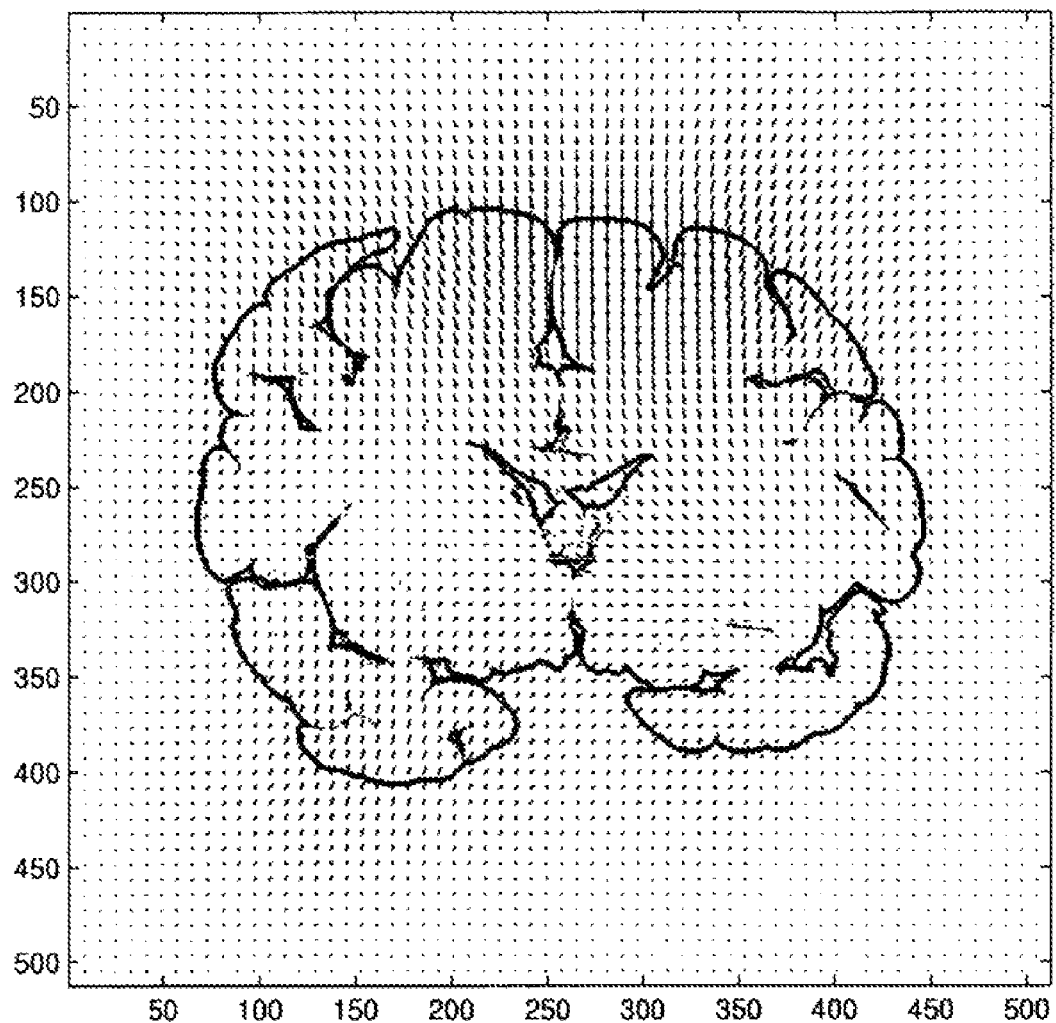

The figures show the following:

FIG. 1: a histological section with stained cytosomes, through a post-mortem brain;

FIG. 2: the section depicted in FIG. 1, after a registration method according to the invention has been carried out; and FIG. 3: a transformation field computed according to the invention.

The histological section through a post-mortem brain depicted in FIG. 1 was prepared by being embedded in paraffin, sliced with a microtome into sections having a thickness of 5 μm to 200 μm, preferably about 20 μm, and subsequently the cytosomes are stained.

These histological processing steps cause considerable deformations. These deformations are not of a linear type and cannot be predicted since they are a function of individual aspects of the processing procedure and thus differ locally.

Examples of considerable deformations are cracks, compressions, extensions and overlapping of individual tissue parts.

Three-dimensional image data sets of the brain were generated using a suitable imaging method, preferably an MR method, prior to the embedding in paraffin.

The data sets of the brain acquired by means of the imaging method are subsequently employed as a non-deformed reference structure for the corresponding data set of the two-dimensional histological section series.

Towards this end, it is advantageous to align the acquired data sets of the brain to correspond with the histological sections by means of a suitable transformation.

This means, for example, that the acquired data sets are normalized and corrected so that they correspond to the appertaining image elements of the histological section.

In this context, it is particularly advantageous that the acquired data set can be aligned so precisely that an image plane matches the plane of the histological section.

Here, in particular, all histological sections are to be associated with the corresponding image planes of the data set.

A linear affine transformation (translation, rotation, shear and/or scaling), a grayscale normalization and a non-linear elastic registration are use to transform the histological section into the corresponding section of the acquired data set is achieved.

In particular, it is advantageous to combine the various transformations in order to allow a sequential processing in a process step and thus to unite the individual transformations. As a result, especially the number of interpolations is reduced.

The digitized histological sections can be especially used to mark functional areas or other structures, to register them three-dimensionally and to transfer them into a shared reference system.

All of the presented transformation methods can be used for this transfer.

In particular, the marking in the digitized histological sections allows a non-interactive transmission of the boundaries of functional areas ascertained by means of the method, allowing a subsequent three-dimensional reconstruction of the post-mortem brains.

An example of a transformation field of the histological section depicted in FIG. 1 into the corrected section depicted in FIG. 2 is shown in FIG. 3.

According to the invention, functional and/or structural properties in spatial regions of the brains are acquired. These properties can be acquired in the form of two-dimensional or three-dimensional images in various ways.

The examination of histological sections of post-mortem brains is particularly advantageous since these sections have a very high resolution.

When it comes to examining the brains of living persons, imaging methods used in medical technology such as positron emission tomography (PET) and magnetic resonance imaging (MRI) are well-suited. In particular, it is practical to detect the areas by means of functional magnetic resonance imaging (fMRI) or high-resolution structural MR.

The term "areas" designates all regions that differ from other regions in terms of at least one structural parameter or one structure-induced functional parameter.

Especially preferred embodiments of the areas are cortical, cytoarchitectonic, receptor-architectonic and myeloarchitectonic areas as well as other areas that differ in terms of the laminar pattern such as can be detected, for example, in histological sections or in structural MR data sets. These laminar patterns are referred to as "architectonic" properties of the cortex.

The determination of cortical boundaries is objectified using an algorithm-based method that is based on the detection of laminar changes in morphometric and/or stereological parameters of the cortex, for instance, of the grey level index (Schleicher and Zilles, 1990: A quantitative approach to cytoarchitectonics: analysis of structural inhomogeneities in nervous tissue using an image analyzer. *J. Microsc.* 157: 367-381) and of the optical density, using the multimodal evaluation of these profiles that—through feature extraction and distance computation, e.g. the Mahalanobis distance—quantify laminar changes, and using the statistical examination of the significance of the distance measures (for instance, the Hotelling T-square test).

The Hotelling T-square test is a multivariate method to confirm a statistically significant difference between two groups of objects, in the present case, of two groups of feature vectors (Bortz 1999). Each group describes the form of the laminar pattern in a defined cortex section. The test computes the Mahalanobis distance between two groups and examines the significance by comparing the distance to a threshold value computed from the data.

Other possibilities for the statistical examination of the significance of the distance measures are known from Bortz J. (1999) Statistik für Sozialwissenschaftler [Statistics for social scientists], published by Springer, Berlin, Germany.

Alternatives for examining the distance measures are the single-factor, multivariate analysis of variance (MANOVA) as well as suitable permutation tests. The advantage of the Hotelling T-square test is that it takes into account the correlation between the features and the thus enhanced sensitivity of the test for the boundary search. Permutation tests are likewise implemented but they require a great deal of computation resources and their outcome is similar to that of the Hotelling T-square test.

$$D^2 = d' \times C^{-1} \times d$$

Here, $D^2$ is the Mahalanobis distance, whereby d stands for the mean differential vector of the feature vectors, d' stands for the transposed mean differential vector and $C^{-1}$ stands for the inverse of the pooled variance-covariance matrix (Mahalanobis 1949). Mahalanobis, P. C., Majumba, D. N., Rao, C. R. (1949). Anthropometric survey of the united provinces. A statistical study. Sankhya 9, 89-324.

Non-laminar structures such as, for instance, subcortical core regions, can likewise be defined as "areas" on the basis of their architectonic properties.

The boundaries defined in two-dimensional histological sections or two-dimensional MR data sets are marked in the corresponding image of the histological section or MR data set, then they are three-dimensionally reconstructed in the same manner and adapted in the context of the complete brain section series to a target volume data set of any other human brain by means of a multi-stage registration method that concludes with a non-linear elastic registration. In this context, a multigrid approach and/or multi-scale approach is employed to compute transformation fields that indicate a vector for each element of the target data set, said vector describing the transformation of the target data set into the initial data set.

The data sets of architectonicrally defined areas acquired from various post-mortem or in-vivo brains are made to overlap in this target data set, whereby probability maps are computed that, for each voxel of the reference space, indicate a relative frequency with which the region in the examined random sample of post-mortem brains was present, whereby these maps are color-coded.

The probability maps and the volume data set of the brain of a patient or test subject (for example, MRI, CT) are transformed in the same space and are made to overlap there. This can be either the space of the volume data set of the brain of a patient or test subject or of the probability maps.

In order to achieve an unambiguous registration of structures in the patient brains that correspond to each other, for instance, structures with a brain lesion (especially a tumor, following an infarction) with probability maps in the reference brain, the energy functional is modified at the site of the structural changes in such a manner that only the elastic portion and not the grayscale distance is taken into consideration in the energy functional.

The transformation will be elucidated below in a general form on the basis of a template image and a reference image. The template image is, in particular, the initial image. The reference image is, for example, an image or an image element of a reference brain or of a data set of the initial image acquired in some other way and/or at a different point in time than the template image.

Let us take, for example, two images, T (template) and R (reference), which are defined by functions on a region $\Omega \subset R^n$. It is assumed that T has resulted from R by a transformation $\Phi^{-1}$. Now the transformation $\Phi(u)(x):x \mapsto x-u(x)$ is sought. The function $\Phi$ constitutes a relation between points of the reference and points of the template.

The difference between the two images can be characterized by a suitable distance measure $D[T,R,u,\Omega]$. In order to compute $\Phi$, a u that minimizes D is sought. This problem is generally poorly constructed. At least one of the following conditions is violated:

a solution exists;
the solution is unambiguous;
the solution is continuous in the data.

The third condition implies that small changes in the data may only lead to small changes in the solution. This can also be understood as a requirement for the robustness against noise.

In order to ensure the regularity of the solution u, in addition to D, a regularization term $R[\alpha,u,\Omega]$ is considered that favors certain classes of transformations—i.e. it remains small for these transformations—and that punishes all other transformations—i.e. it becomes large for these transformations. The parameter $\alpha$ is a scalar that scales the magnitude of R and thus controls its influence.

Different registration methods often differ in the selection of the distance D and of the regularization term R. If the grayscales of T and R are comparable, the squared grayscale distance (SSD: sum of squared differences)

$$D[T, R, u, \Omega] = \frac{1}{2}\int_\Omega (T(x-u(x))-R(x))^2 dx$$
$$= \frac{1}{2}\int_\Omega d(u(x))^2 dx$$
$$= \frac{1}{2}\|d(u)\|_2^2$$

is available as the distance measure. If the images stem from various imaging methods (multimodal), this is often not the case, for example, with MR and CT. Possibly, different things are presented, for example, in the case of MR and PET. Then suitable distance measures have to be defined. In some cases, suitable gray-scale transformations make it possible to adapt the grayscale of images from various modalities to each other, for instance, in the case of MR and histology. In such cases, the measure described above can also be employed. In the multimodal case, statistical measures are often employed such as mutual information (MI) that establish a relation for the distributions of the grayscale.

As the regularization system, the elastic potential of the displacement u is selected. This leads to the bilinear form $$I[u, v] = \int_\Omega \left(\lambda \, div(u) div(v) + 2\mu \sum_{ij}^n \varepsilon_{ij}(u)\varepsilon_{ij}(v)\right) dx,$$

wherein $$\varepsilon_{ij} := \frac{1}{2}\left(\frac{\partial u_i}{\partial x_j} + \frac{\partial u_j}{\partial x_i}\right).$$

In order to allow the minimization of the non-linear functional, D is linearized using the Taylor series expansion and regularized with R. This leads either to a regularized gradient descent method or to a regularized Newtonian method. The preferred method is the Newtonian method. By means of variational calculus, the Euler-Lagrange equations are computed, whose solution constitutes a necessary condition for a minimum. The equations for the regularized gradient descent method read as follows $$\alpha Lu(x) = \nabla T(x-u(x))(T(x-u(x))-R(x)) \quad \text{when } x\in\Omega$$
$$u(x)=0 \quad \text{when } x\in\partial\Omega.$$

This is also referred to below as boundary value problem 1. For the regularized Newtonian method, one obtains $$(J_d^t J_d + \alpha L)u(x) = \nabla T(x-u(x))(T(x-u(x))-R(x)) \quad \text{when } x\in\Omega$$
$$u(x)=0 \quad \text{when } x\in\partial\Omega.$$

This is also referred to below as boundary value problem 2. The elliptical differential operator L is the Navier-Lamé operator $$Lu = -\mu\mu - (\mu+\lambda)\nabla(\nabla u),$$

with the Lamé constants $\mu$, $\lambda$, which describe the elastic properties. The term $J_d^t J_d$ is the linear portion of the Hessian matrix from the linearization of D, whereby $J_d = (\partial T_u/\partial x_1, \ldots, \partial T_u/\partial x_m)$.

Both methods define an iteration $$u^{k+1} = u^k + v,$$

wherein v corresponds to the solution of the boundary value problem.

In the case of the gradient descent method, v corresponds to a descent direction. The essential problem consists in the selection of a suitable increment. For this purpose, the solution is normalized to a unit length $\hat{v} := v/\|v\|_\infty$ and a parameter $\tau^*$, so that the following applies $$\tau^* = \arg\min_{\tau\in[0,v_{max}]} D(u^k+\tau v)\tau.$$

This procedure is also designated as a line search, since the increment that minimizes the distance is sought along a line of the descent direction. The maximum permissible increment is determined here by $v_{max}$. The selection of $\alpha$ is not decisive here, it only influences $\|v\|_\infty$ since $\alpha$ enters the equation linearly. Therefore, the parameter is implicitly determined by the selection of $v_{max}$. This also implies that small increments correspond to a pronounced regularization. In the case of boundary value problem 2, the selection of $\alpha$ plays an important role since it has to be selected a priori. The parameter is controlled by a trust-region strategy. The linearization of D is only valid in an environment whose size depends on the error of the linearization. An appropriate selection of $\alpha$ guarantees that the computed solution lies in a given radius relative to the norm induced by L. A large a results in a small trust-region radius, while a small $\alpha$ results in a large trust-region radius. For purposes of controlling the parameter, the ratio between the actual reduction and the reduction predicted by the linear model is ascertained. This leads to the Armijo-Goldstein rule $$\rho_k = \frac{D(u^k) - D(u^k+v)}{\langle \nabla T_u(T_u - R), v\rangle}.$$

The parameter $\alpha$ and the next iterated $u^{k+1}$ are ascertained as follows:

$$(\alpha_{k+1}, u^{k+1}) = \begin{cases} \left(\frac{1}{2}\alpha_k, u^{k+1}\right) & \text{for } \rho_k > \rho_+ \\ (2\alpha_k, u^k) & \text{for } \rho_k > \rho_- \\ (\alpha_k, u^{k+1}) & \text{otherwise} \end{cases}$$

If $\rho_k$ is smaller than a selected value $\rho_{31}$, then the new solution is discarded and the trust-region radius is reduced. If it is greater than a selected $\rho_+$ value, then the new solution is accepted and the trust-region radius is enlarged. In all other cases, the solution is accepted and the trust-region radius is retained. Preferred values are $\rho_- = 0.1$ and $\rho_+ = 0.5$.

The Method in a Comparison

The gradient descent methods are globally convergent methods. Generally speaking, they only converge very slowly, that is to say, a large number of iterations is needed because the linearization often has a small error only in small regions. The line search does not alter this in the least since the parameter $v_{max}$ can only be selected with a large value in regions where the linear model is a good approximation of the non-linear functional, and the checking of large intervals is very demanding. If $v_{max}=2$, in other words, if a displacement of two pixels at the maximum is selected, this should be considered as a parameter that constitutes a good compromise.

The Newtonian methods are locally convergent methods, that is to say, they converge very quickly in the vicinity of the solution. At a further distance from the solution, the Newton direction does not necessarily have to be a descent direction if, for example, the Hessian matrix is not positively defined. This problem is eliminated by the trust-region strategy.

For $\alpha \to \infty$, the method behaves essentially like a gradient descent method. In those cases where the Hessian matrix is poorly conditioned, the parameter $\alpha$ is selected with a large value. This is the same as a pronounced regularization of the problem and consequently the Newton direction is also a descent direction. As one approaches the solution, $\alpha$ becomes continuously smaller and the method behaves more like a Newton method, that is to say, it yields a quick local convergence.

Instead of the trust-region strategy, a classic line search could also be employed here once again. However, then, $\alpha$ is fixed and the properties just described are not obtained. Moreover, this again exacerbates the problem of a suitable selection of the parameter $\alpha$. With the trust-region strategy, $\alpha$ can be selected conservatively (large) in the beginning and the algorithm adapts $\alpha$ over the course of the iteration. A static $\alpha$, in contrast, is always a compromise between stability and convergence behavior.

The equations are discretized over the $\Omega$ region. This leads to a system of partial differential equations whose solution is the displacement u in each discrete grid point. The equations are solved with multigrid methods.

Multigrid Solver for Inner Iteration

Multigrid methods are efficient iterative equation system solvers that can compute approximative solutions with any desired accuracy in asymptotic linear time (U. Trottenberg, C. W. Oosterlee and A. Schüiller (2001): *Multigrid*, Academic Press). Multigrid methods consist of several components. Essentially, these are: relaxation, restriction, interpolation, coarse grid correction cycle. The selection of the components depends on the underlying equation.

For the regularized descent method, that is to say, in the case of boundary value problem 1, a standard multigrid method can be employed. This preferably has the following components:
prolongation (interpolation) with linear interpolation;
restriction with full weighting;
coarse grid correction with correction scheme (CS) in the case of linear equations;
point-by-point Gauss-Seidel method as a smoother.

The following are to be considered as additional parameters: the number of smoothing steps, the type of multigrid cycle (V, F or W cycle) and the coarsest grid on which a direct solver, for instance, a Gauss method, is used. Normally, a V or F cycle suffices for this equation. Then the W cycle is not needed. The direct solver is used when further coarsening is no longer possible. The number of smoothing steps is typically two pre-smoothing steps and one post-smoothing step. These parameters can be ascertained very easily by means of numerical experiments and are utilized as standard parameters.

Other components have to be chosen for the regularized Newtonian method, that is to say, for boundary value problem 2. This is due to the fact that the expression $J_d^T J_d$ causes pronounced jumps in the coefficients of the equation system. This, in turn, considerably worsens the convergence of the multigrid solver. The changes essentially relate to the relaxation method, which is a particularly preferred part of the multigrid method. Instead of the point-by-point relaxation, like with the standard multigrid, entire lines are relaxed. As a result, pronounced local differences are better detected. The band-limited linear equation systems that occur in the line relaxation are solved with an appropriate direct solver that contains the asymptotic complexity of the multigrid method. In addition, an operator-dependent coarse grid correction is used that yields a further improved convergence and robustness against noise in the image data.

In order to also be able to compute large displacements and to increase the speed, the method is embedded into a multi-resolution approach. The images are coarsened in a pyramid up to a defined resolution. At the lowest resolution of the pyramid, a displacement is computed that serves as a start approximation for the next resolution stage. In this manner, first of all, coarse structures are adapted and then ever finer structures are adapted in each subsequent step. Aside from the improved speed of execution, the method also becomes more robust against local minima since large displacements are computed at coarse resolutions.

The displacements u computed by the method are also referred to as transformation fields. By means of these transformation fields, any desired information can be transformed from the template space into the reference space. For this purpose, for each point in the reference space, the appertaining point in the template space is ascertained. In the case of image data, the value of this point is ascertained through interpolation. Data from various template spaces can be compared in a uniform reference space. Transformation fields characterize the shape of the brain relative to a reference brain. These fields, in turn, can be statistically further processed and evaluated in order to detect group differences, for instance, between patients and healthy controls or changes in the shape of the brain over the course of time.

The method is employed for the reconstruction of the three-dimensional representation of histological section series (two-dimensional case) as well as for the registration of volume data sets (three-dimensional case).

The invention claimed is:

1. In a method for the topographical presentation of changes in an examined brain, through the use of volume data sets, the method comprising the steps of:
generating three-dimensional image data sets of the examined brain using positron emission tomography, magnetic-resonance imaging, or high-resolution MR,
employing the generated data sets as a nondeformed reference structure for the corresponding data set of digitized histological sections of the two dimensional histological section series,
mapping areas by extracting profiles showing boundaries of two areas of the examined brain,
detecting the boundaries of the two areas by computing a multivariate distance measure,
acquiring a change in a microstructure in the region of the boundary of the two areas and comparing the acquired change to at least one microstructure of a boundary region of a reference brain, and aligning the acquired data sets of the brain to correspond with the histological section by use of a predetermined transformation, the improvement comprising the step of:

using an elastic registration method to perform the transformation, transforming the volume data sets into a target volume data set, basing the computed transformation on an initial image and a reference image of the examined brain, a difference between the two images being characterized by a suitable distance D, and in order to ensure the regularity of a computed solution u where small changes in the data only lead to small changes in the solution that minimizes D, a regularization term R [α,u,Ω] is considered in addition to D that favors certain classes of transformations where R remains small for these transformations.

2. The method defined in claim 1, further comprising the step of:

minimizing a grayscale-based energy functional by means of a multigrid method.

3. The method defined in claim 2 wherein the energy functional consists of an elastic portion and of a grayscale distance of the volume data sets.

4. The method defined in claim 1, further comprising the steps of:

ascertaining the boundary between the areas by means of a change in at least one architectonic parameter, acquiring underlying resulting voxels of the initial data set, and transforming the acquired voxels by means of a transformation method in such a way that they correspond to at least individual voxels of a reference brain.

5. The method defined in claim 4 wherein the acquired voxels are transformed by:

ascertaining in each case for voxels of the reference brain a vector allowing a transformation into the appertaining spatial coordinates of the examined brain, and storing several vectors are stored and then making them available for as many further examinations as desired.

6. The method defined in claim 1, further comprising the steps of:

overlapping the data of examined brains in a target data set by a process in which probability maps are computed that, for several voxels of the target data set, indicate the relative frequency with which the ascertained functional area is present in a corresponding region of a reference brain.

7. The method defined in claim 1, further comprising the step of:

overlapping the data of at least one examined brain in a target data set by a process in which the data is compared to each other or to data of the target data set, especially probability maps.

8. The method defined in claim 1, further comprising the step of:

displaying or printing the computed transformation.

* * * * *